(12) United States Patent
Bar-Sade et al.

(10) Patent No.: US 9,059,866 B2
(45) Date of Patent: Jun. 16, 2015

(54) DIGITAL MICROWAVE RADIO SYSTEM AND METHOD WITH ENCRYPTION

(75) Inventors: Idan Bar-Sade, Sunnyvale, CA (US); Eliezer Pasternak, Palo Alto, CA (US); Bin Zhang, Fremont, CA (US)

(73) Assignee: REMEC BROADBAND WIRELESS HOLDINGS, INC., San Diego, CA (US)

( * ) Notice: Subject to any disclaimer, the term of this patent is extended or adjusted under 35 U.S.C. 154(b) by 1930 days.

(21) Appl. No.: 11/825,879

(22) Filed: Jul. 9, 2007

(65) Prior Publication Data

US 2008/0267314 A1 Oct. 30, 2008

Related U.S. Application Data

(63) Continuation-in-part of application No. 11/322,972, filed on Dec. 30, 2005.

(51) Int. Cl.

| | |
|---|---|
| H04L 12/46 | (2006.01) |
| H04K 1/00 | (2006.01) |
| H04L 1/00 | (2006.01) |
| H04L 29/06 | (2006.01) |
| H04W 12/02 | (2009.01) |
| H04L 9/06 | (2006.01) |
| H03M 13/15 | (2006.01) |
| H03M 13/27 | (2006.01) |

(52) U.S. Cl.
CPC .............. *H04L 12/46* (2013.01); *H03M 13/15* (2013.01); *H03M 13/1515* (2013.01); *H03M 13/2707* (2013.01); *H04K 1/00* (2013.01); *H04L 1/0041* (2013.01); *H04L 1/0056* (2013.01); *H04L 12/4604* (2013.01); *H04L 63/0428* (2013.01); *H04L 63/166* (2013.01); *H04W 12/02* (2013.01); *H04L 9/0637* (2013.01); *H04L 2209/34* (2013.01); *H04L 2209/80* (2013.01)

(58) Field of Classification Search
CPC ............................ H04L 63/0428; H04L 9/065
USPC ...................................................... 380/37, 270
See application file for complete search history.

(56) References Cited

U.S. PATENT DOCUMENTS

| | | | |
|---|---|---|---|
| 5,349,644 A | 9/1994 | Massey et al. | |
| 5,789,988 A | 8/1998 | Sasaki | |
| 5,907,560 A * | 5/1999 | Spruyt | 714/701 |

(Continued)

FOREIGN PATENT DOCUMENTS

| | | |
|---|---|---|
| EP | 1 303 067 | 4/2004 |
| WO | WO 96/24225 | 8/1996 |
| WO | WO 99/62225 | 12/1999 |

OTHER PUBLICATIONS

S. Bryant, G. Swallow, L. Martini, D. McPherson; Pseudowire Emulation Edge to Edge Control Word for Use over an MPLS PSN; RFC 4385; Feb. 2006.*

(Continued)

*Primary Examiner* — Luu Pham
*Assistant Examiner* — James Turchen
(74) *Attorney, Agent, or Firm* — DLA Piper LLP (US)

(57) ABSTRACT

A communications system are provided that provides integrated encryption capabilities. In particular, a digital microwave system, terminal and method are provided in which the encryption functions are integrated into the digital microwave terminals. The digital microwave system may also be implemented with external encryption units.

24 Claims, 9 Drawing Sheets

(56) References Cited

U.S. PATENT DOCUMENTS

| | | | |
|---|---|---|---|
| 6,028,933 A * | 2/2000 | Heer et al. | 713/169 |
| 6,157,679 A * | 12/2000 | Johnson | 375/281 |
| 6,215,789 B1 | 4/2001 | Keenan et al. | |
| 6,330,236 B1 * | 12/2001 | Ofek et al. | 370/369 |
| 6,349,138 B1 * | 2/2002 | Doshi et al. | 380/200 |
| 6,359,938 B1 * | 3/2002 | Keevill et al. | 375/316 |
| 6,483,814 B1 | 11/2002 | Hsu et al. | |
| 6,496,519 B1 | 12/2002 | Russell et al. | |
| 6,539,031 B1 * | 3/2003 | Ngoc et al. | 370/470 |
| 6,567,473 B1 * | 5/2003 | Tzannes | 375/260 |
| 6,907,048 B1 * | 6/2005 | Treadaway et al. | 370/474 |
| 6,925,113 B2 | 8/2005 | Kim et al. | |
| 6,937,666 B2 | 8/2005 | Pasternak | 375/272 |
| 6,973,141 B1 | 12/2005 | Isaksen et al. | |
| 7,002,941 B1 * | 2/2006 | Treadaway et al. | 370/338 |
| 7,010,738 B2 | 3/2006 | Morioka et al. | |
| 7,055,039 B2 * | 5/2006 | Chavanne et al. | 713/193 |
| 7,065,326 B2 | 6/2006 | Lovberg et al. | |
| 7,103,279 B1 | 9/2006 | Koh et al. | |
| 7,133,423 B1 * | 11/2006 | Chow et al. | 370/504 |
| 7,142,564 B1 * | 11/2006 | Parruck et al. | 370/474 |
| 7,200,336 B2 | 4/2007 | Yu et al. | |
| 7,205,911 B2 | 4/2007 | Kim et al. | |
| 7,245,633 B1 * | 7/2007 | Mueller | 370/466 |
| 7,280,609 B2 | 10/2007 | Dottling et al. | |
| 7,324,600 B2 * | 1/2008 | Pauli et al. | 375/260 |
| 7,359,407 B1 | 4/2008 | Mattos et al. | |
| 7,392,092 B2 | 6/2008 | Li et al. | |
| 7,392,279 B1 | 6/2008 | Chandran et al. | |
| 7,424,058 B1 * | 9/2008 | Staley et al. | 375/240.23 |
| 7,457,947 B2 * | 11/2008 | Carr | 713/153 |
| 7,529,215 B2 * | 5/2009 | Osterling | 370/338 |
| 7,564,908 B2 * | 7/2009 | Luz et al. | 375/260 |
| 7,627,023 B1 | 12/2009 | Lo | |
| 7,688,806 B2 | 3/2010 | Shore et al. | |
| 7,715,419 B2 * | 5/2010 | Tatar et al. | 370/419 |
| 7,752,430 B2 * | 7/2010 | Dzung | 713/151 |
| 7,930,543 B2 * | 4/2011 | Corndorf | 713/172 |
| 8,041,233 B2 | 10/2011 | Hueda et al. | |
| 2002/0021720 A1 | 2/2002 | Seto et al. | |
| 2002/0044651 A1 * | 4/2002 | Tuvell | 380/37 |
| 2002/0111158 A1 | 8/2002 | Tee | |
| 2002/0164951 A1 | 11/2002 | Slaughter et al. | |
| 2002/0176139 A1 | 11/2002 | Slaughter et al. | |
| 2003/0035430 A1 | 2/2003 | Islam et al. | |
| 2003/0076787 A1 | 4/2003 | Katz et al. | |
| 2003/0179771 A1 | 9/2003 | Chan | |
| 2004/0028164 A1 * | 2/2004 | Jiang et al. | 375/371 |
| 2004/0033079 A1 | 2/2004 | Sheth et al. | |
| 2004/0120418 A1 | 6/2004 | Pasternak | |
| 2004/0127158 A1 | 7/2004 | Dai et al. | |
| 2004/0208243 A1 | 10/2004 | Feher | |
| 2005/0075078 A1 | 4/2005 | Makinen | |
| 2005/0088991 A1 | 4/2005 | Kil | |
| 2005/0196119 A1 | 9/2005 | Popovic et al. | |
| 2006/0050870 A1 | 3/2006 | Kimmel et al. | |
| 2006/0056620 A1 | 3/2006 | Shingal et al. | |
| 2006/0084406 A1 | 4/2006 | Strachan et al. | |
| 2006/0171714 A1 | 8/2006 | Dove | |
| 2006/0264210 A1 * | 11/2006 | Lovberg et al. | 455/422.1 |
| 2007/0014395 A1 | 1/2007 | Joshi et al. | |
| 2007/0153726 A1 | 7/2007 | Bar-Sade et al. | |
| 2010/0034385 A1 * | 2/2010 | Gantman et al. | 380/268 |

OTHER PUBLICATIONS

William Stallings; Gigabit Ethernet; The Internet Protocol Journal—vol. 2, No. 3; Sep. 1999.*

Block Ciphers and Stream Ciphers: The State of the Art Alex Biryukov Katholieke Universiteit Leuven 2004 retrieved Aug. 27, 2012 from http://eprint.iacr.org/2004/.*

IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Computer Society; Jun. 12, 2007; IEEE Std 802.11™—2007 (Revision of IEEE Std 802.11-1999).*

An Implementation of a Gigabit Ethernet AES Encryption Engine for Application Processing in SDR; Daniel Denning et al.; IEEE; 2004.*

Clock Management in a Gigabit Ethernet Physical Layer Transceiver Circuit; Juan C Diaz et al,; Proceedings of the Design, Automation and Test in Europe Conference and Exhibition Designers' Forum (Date'04); IEEE; 2004.*

PCT/US08/08491 International Search Report, dated Oct. 6, 2008.

PCT/US08/08491 Written Opinion, dated Oct. 6, 2008.

PCT/US2008/008491 International Preliminary Report dated Jan. 12, 2010.

Housley & Corry, "GigaBeam Radio Link Encryption", Oct. 2006, 14 pages.

Federal Information Processing Standards Publication 197, "Advanced Encryption Standard (AES)", Nov. 26, 2001, 47 pages.

Federal Information Processing Standards Publication 140-2, "Security Requirements for Cryptographic Modules", May 25, 2001, 61 pages.

Morris, Dworkin, "Recommendation for Block Cipher Modes of Operation, Methods and Techniques, Computer Security", National Institute of Standards and Technology (NIST) Special Publication 800-38A, 2001 Edition, Dec. 2001, 59 pages.

PCT International Search Report of PCT/US06/46856; dated Nov. 28, 2008.

PCT Written Opinion of International Searching Authority of PCT/US06/46856; dated Nov. 28, 2008.

PCT International Preliminary Report on Patentability of PCT/US06/46856; dated Nov. 9, 2010.

PCT International Search Report of PCT/US10/61929; dated Apr. 25, 2011.

PCT Written Opinion of International Searching Authority of PCT/US10/61929; dated Apr. 25, 2011.

PCT International Preliminary Report on Patentability of PCT/US10/61929; dated Jul. 10, 2012.

European Search Report of EP 06845016; dated Jun. 14, 2011.

10/100/1000Mbps Ethernet MAC with protocol Acceleration, MAC-NET Core with Avalon Interface, Product Brief, Version 1.0—Feb. 2004.

* cited by examiner

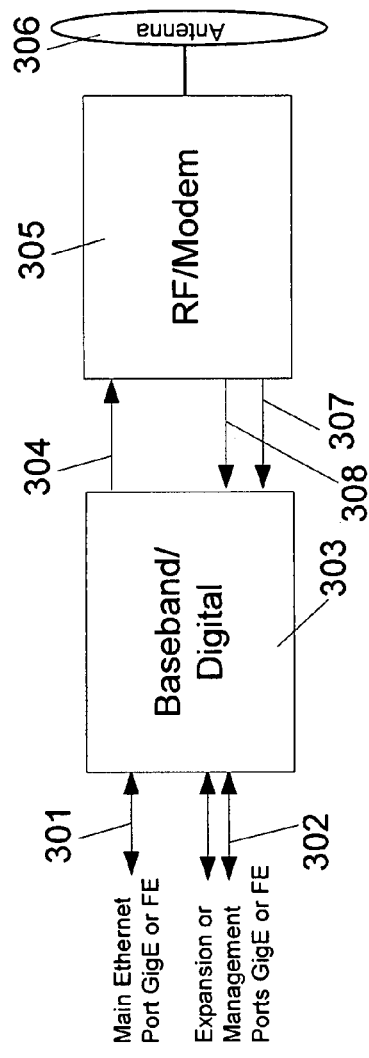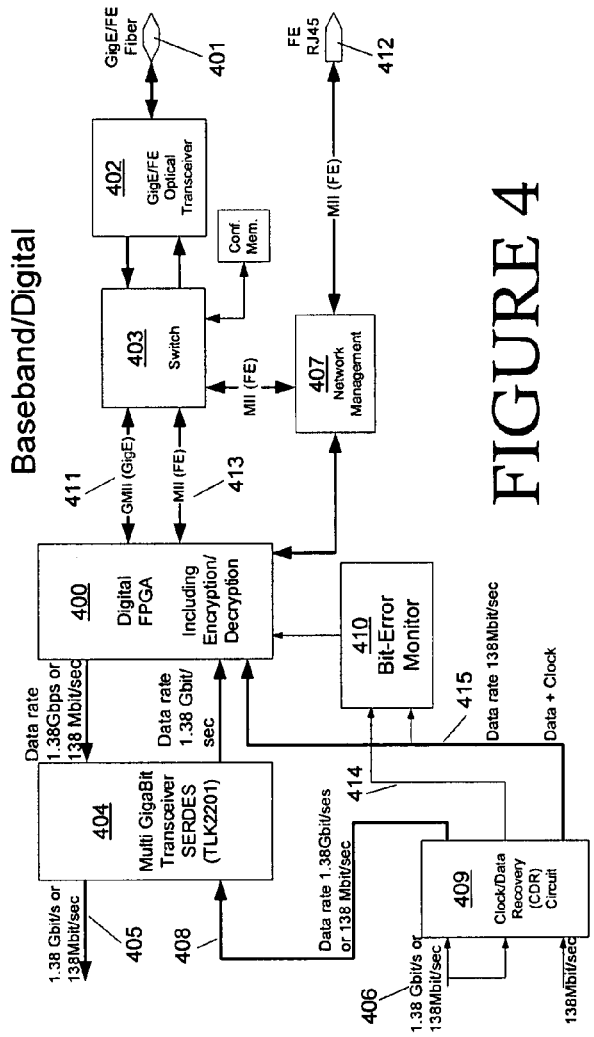

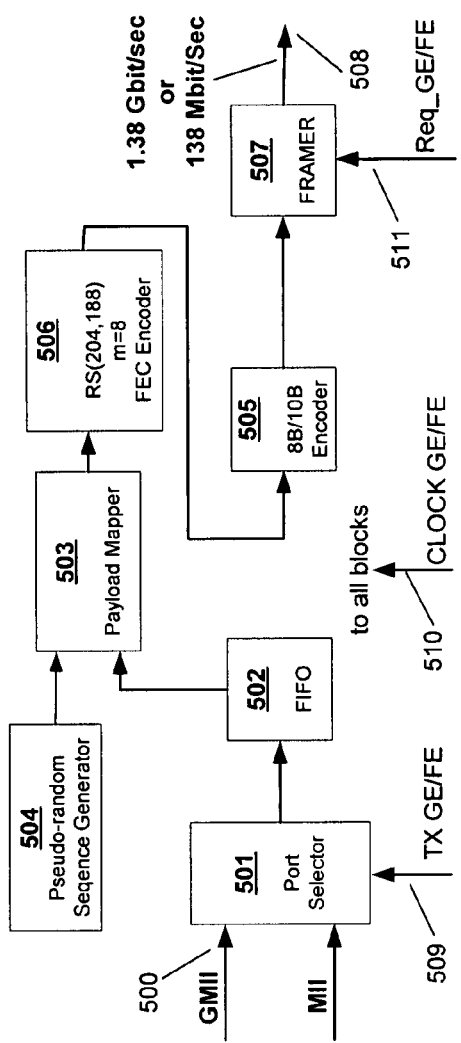
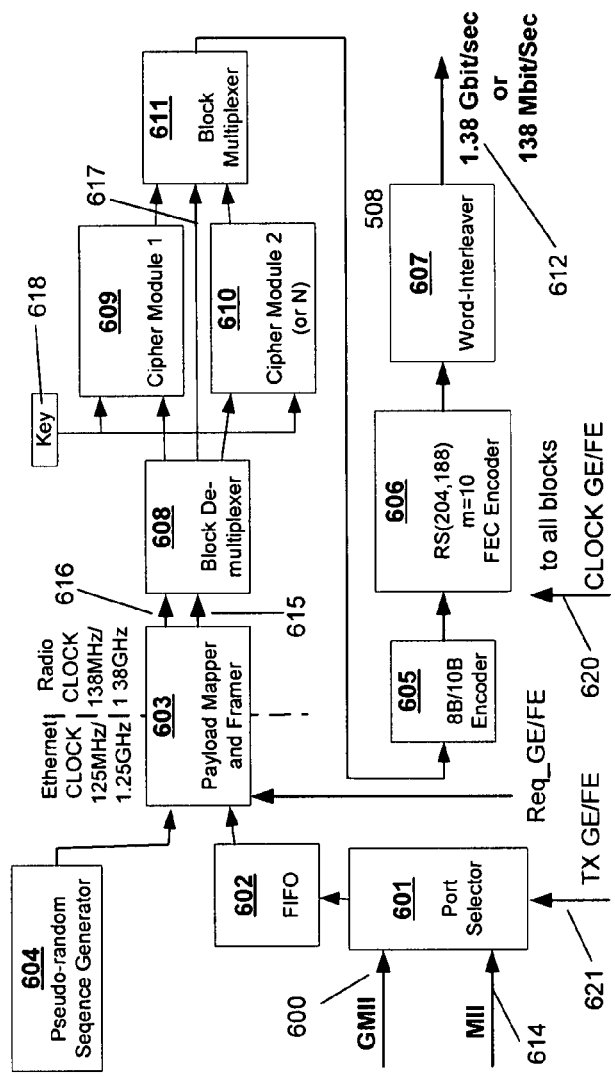

DIGITAL MICROWAVE RADIO SYSTEM AND METHOD WITH ENCRYPTION

PRIORITY CLAIM

This application claims priority under 35 USC 120 to and is a continuation in part of U.S. patent application Ser. No. 11/322,972 filed on Dec. 30, 2005 and entitled "Digital Microwave Radio System" which is incorporated herein by reference.

FIELD

The system and method relate generally to the fields of digital microwave radio transmission and digital encryption.

BACKGROUND

When digital microwave radio links transmit sensitive information, there is always a concern for security. While some microwave links, especially at the millimeter wave bands, have high degree of security by the nature of the narrow-beam propagation, many users, especially in government and large commercial institutions, require extra means of security, and data encryption plays a major role in implementing such security policies. Governments and other organizations require multiple layers of security that may co-exist in the same link. The more sensitive data is encrypted at the source, while less sensitive data is encrypted only if it leaves the premises for transmission through outside media, including wireless links. The data may also be encrypted by encrypting the entire payload of the microwave link. If a part or the entire payload has been encrypted with high-security techniques at the source, there may still be a desire to supply lower-level security for the entire link's payload as an extra barrier.

One common way of implementing an encryption system is by using a stand-alone system. For example, to secure a (GigE) link, one can purchase a stand alone system with two ports; one port is the local, unsecured GigE port, and the other is an encrypted GigE port. Network integrators may favor this solution in some instances because it allows the use of any non-secure wireless link, however there are also drawbacks, as discussed below. An example of a commercial supplier of encryption system is Fortress Technologies of Oldsmar, Fla.

An example of a well known encryption standard is the encryption standard described as the United States Federal Information Processing Standard (FIPS), PUB 140-2 which is incorporated herein by reference. This standard includes several procedures for ensuring security, including the use of an encryption algorithm known as the Advanced Encryption Standard (AES), and the definition of four levels of security.

At the core of many encryption systems, including AES, there is a cipher module. A cipher module transforms a block of input information, known as "Plaintext" to an encrypted block, known as "Ciphertext", usually of the same size as the Plaintext, by using a transformation-algorithm. The algorithm usually includes a binary block known as a cipher key. The receiving side performs an inverse transformation to recover the original Plaintext, using a decoding key, usually identical to the transmitter's key. While encryption standards involve several procedures and techniques, such as key distribution methods or providing seals for detecting temper-attempts, these standards do not contemplate or describe how to integrate one or more cipher blocks with microwave radio equipment and the resulting structures and processes needed to accomplish such an integration.

A simple integration step could be to incorporate an entire encryption unit within a radio enclosure. However, such an approach is too expensive, significantly decreases overall link reliability, may add undesired processing delay, and may introduce a major reduction in data throughput of the microwave radio. Thus, it is desirable to integrate a digital radio with only the necessary encryption functions, without the extra hardware already available in the radio, such as the Ethernet interfaces.

Commercially available encryption units may add a significant overhead to the carried payload, thus reducing the capacity of the link. This overhead may be necessary when each frame is destined to a different end point, for example, a WiFi access point broadcasting to multiple devices. However, the wireless links using the digital microwave radio are point-to-point point and thus it is desired to devise an encryption sub-system and associated methods that do not increase the link overhead beyond the overhead already allocated for link-specific functions, such as forward error correction. The commercially available encryption systems may also suffer from processing speed limitation when the GigE link is nearing its payload capacity, and some Ethernet frames or related packets may be dropped. It is desired to provide a digital solution that meets the processing capacity requirements without exceptions.

Thus, it is desirable to be able to integrate encryption modules into a digital microwave link, including various sub-systems and processes.

SUMMARY

A digital microwave communications system and method are provided that include an integral encryption/decryption operation. The system includes a secure microwave link consisting of at least two radio transceiver terminals with at least one encryption function per each transmitting side and at least one decryption function per each receiving, side. The terminal of the system may include a radio portion and a digital portion. A radio transceiver terminal may include more than a single Input/Output port, and a built-in Ethernet switch may be also included. In addition, the link may incorporate bit-rate adaptation. In the various embodiments, the digital microwave communications system and method may include at least one microwave radio transmitter with an encryption function, at least one microwave radio receiver with an encryption function or at least two radio transceiver terminals with at least one encryption function per each transmitting side and at least one decryption function per each receiving side.

BRIEF DESCRIPTION OF THE DRAWINGS

FIG. 3 illustrates some of the building blocks of a digital radio terminal of the system of FIG. 2;

FIG. 4 illustrates more details of the building blocks of the Baseband/Digital portion of the terminal shown in FIG. 3;

FIG. 5 illustrates a digital transmit-processing block diagram of a radio terminal with an external encryption capability;

FIG. 6 illustrates a digital transmit-processing block diagram of a radio terminal with encryption functions;

DETAILED DESCRIPTION OF ONE OR MORE EMBODIMENTS

The system and method are particularly applicable to a digital microwave system, terminal and method that are implemented as described below and it is in this context that the system, terminal and method will be described. It will be appreciated, however, that the system, terminal and method has greater utility since the various elements of the system, terminal and method may be implemented in other known ways and the processes may be implemented in other wireless or wired point-to-point link systems. Furthermore, while the integration of the cipher module within the radio is highly desirable, some of the disclosed techniques can be incorporated into external units.

Figure 1:
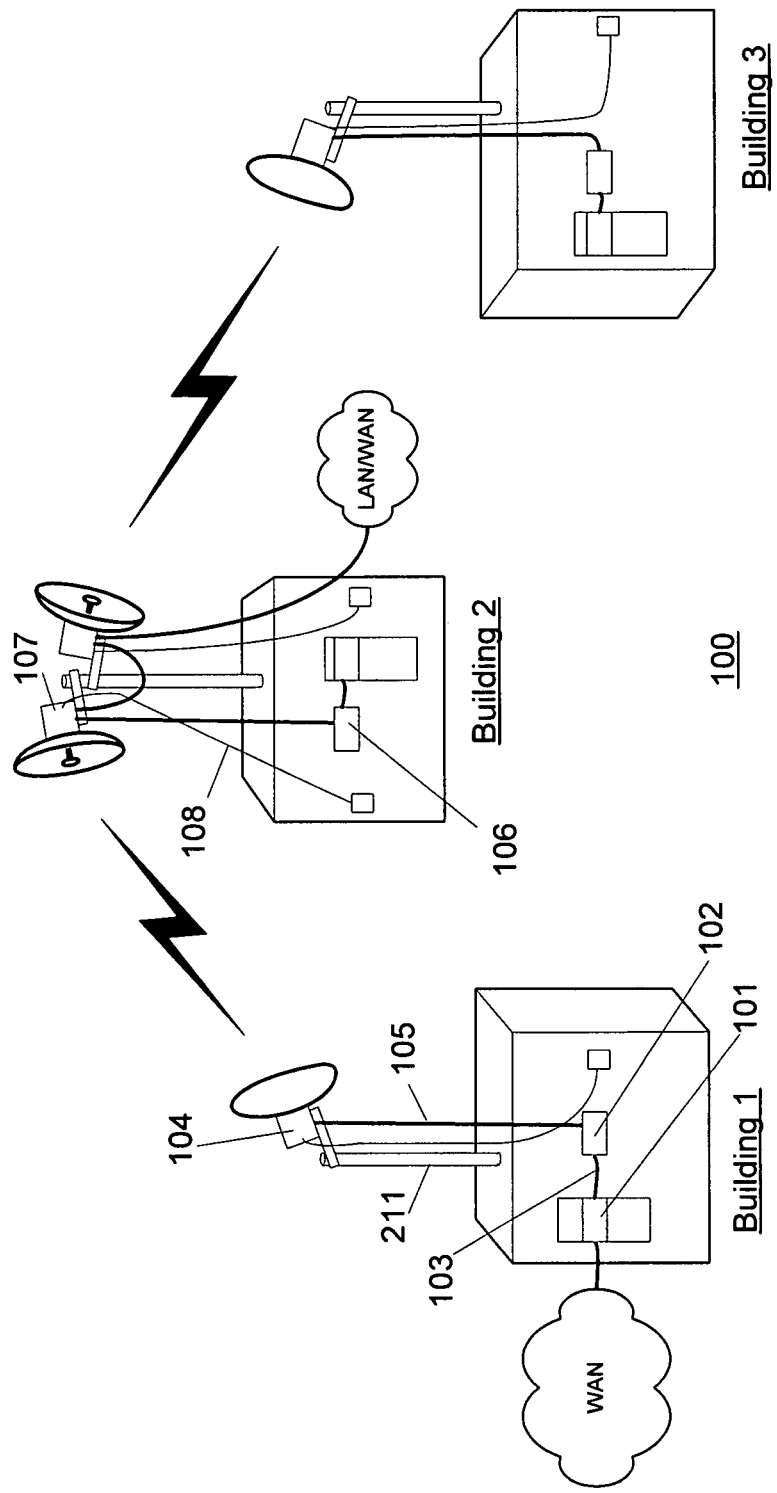
FIG. 1 illustrates a typical communications system that deploys external encryption systems.

FIG. 1 shows a digital network system 100 incorporating digital radio links as described in U.S. Pat. No. 6,937,666 and U.S. patent application Ser. No. 11/322,972 both of which are commonly owned by the assignee of the present application and both of which are incorporated herein by reference. A commercially available encryption system 102 can be placed between the user's networking equipment 101 and a radio terminal 104 using Cables 103 and 105, carrying Ethernet traffic. The Cable 103 may be made of copper twisted pair, fiber optics or any other cable used for data transmission. The Ethernet payload on the cable 103 is not encrypted by the system 102, while the payload in the cable 105 is encrypted. In this configuration, the radio terminal 104 does not need any encryption function, since the sensitive data has been already encrypted by the indoor system 102. A radio terminal 107 at the opposite side of the digital radio link delivers some or all of the received traffic to a local encryption system 106. The system 106 decrypts the received information. Simultaneously, the system 106 may encrypt local data for transmission to the opposite system 102 via the radio link. The systems 102, 106 are commercially available. However some of the functions and processes described can be used to provide improved performance over a copper or fiber optics link even if no wireless transmission is involved, and even if the encryption system remains external to the radio terminal as described below in more detail.

In a system with integrated encryption, all of the combined local traffic intended for transmission over the link is digitally processed for radio transmission. The bit-rate is increased to incorporate link-related overhead. The payload flow is interrupted periodically to add framing words and place-holders for forward error correction error frame check sequences (FCS). Byte-streams from the transmit payload are arranged as fix-sized blocks ("Plaintext") and each block is encrypted using a cipher module, converting each Plaintext block into a Ciphertext block. Each Ciphertext block is then split into bytes. Each byte is converted to a 10-bit word, using an 8B/10B transformation. The 10B words and the framing words are arranged onto FEC word blocks, such as the 188 bytes of a Reed Solomon encoder over a Galois field GF1024, commonly described as RS(204,188) with m=10. The 16-word FCS is appended to the FEC frame. The FEC frame may then be word interleaved, causing spreading of the location of the 16-word FCS within adjacent frames, to reduce spectrum unevenness caused by the FCS, which does not comply with the 10B format. The interleaved words are ready for transmission and are fed to a SERDES device and an RF/modem. The SERDES and RF/modem section can maintain the same structure and bit rate as disclosed in the previous applications.

If one cipher unit cannot perform at the desired clock speed, two or more cipher units may be used in parallel to meet the specified speed. The stream of Plaintext blocks are multiplexed and distributed sequentially among the parallel cipher blocks and the resulting Ciphertext blocks are then rearranged in sequence for further processing as described above. Similar parallel-processing methods can be applied to other functions, such as FCS calculations, and to the corresponding functions at the receive side.

The process of converting Plaintext to a Ciphertext by a direct transformation is known as Electronic Code Book (ECB) mode, as described in NIST Special Publication 800-38A which is incorporated herein by reference. The encryption transformation described above is essentially ECB, were each Plaintext is converted to Ciphertext independently of other data. If a higher level of security is desired, methods of chaining sequential cipher transformation exist as described below in more detail with reference to FIG. 8. One particular method, Cipher Block Chaining (CBC) mode may be used. In CBC mode, each current Plaintext is exclusive-OR-ed with the previous Ciphertext, thus reducing the chance of transmitting identical Ciphertext from identical Plaintext blocks. Since the first Plaintext block does not have a previous Ciphertext, an Initialization vector (IV) is used, which is a random number. Since the radio transmission is continuous, the IV is used only once, for starting the transmission. If several (n) cipher modules are used in parallel as described above, each module preferably chains only its own previous Ciphertext with this same module's next Plaintext, thus forming n-parallel CBC chains. Since n initialization vectors are needed, the first IV is incremented per each cipher module.

The radio receiver converts the received radio signal to a series of bits, which are converted to by the SERDES to parallel 10-bit words fed to the Digital Section. The digital operations and processes are the inverse operations of the transmission processes and functions described above. This reception operation is further discussed below.

Figure 2:
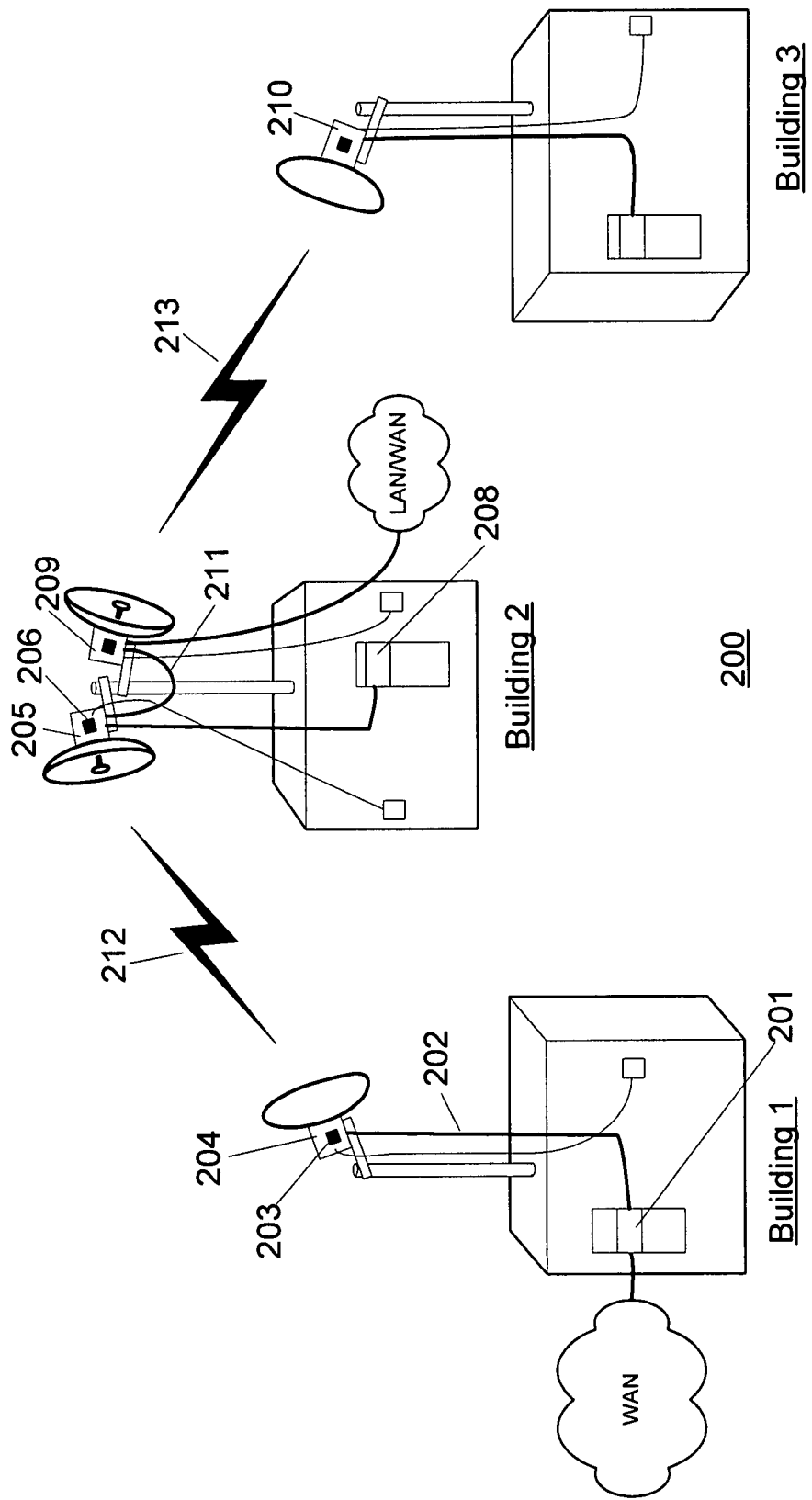
FIG. 2 illustrates a communications system with integrated encryption functions.

FIG. 2 shows a communications system 200 that may be implemented using one or more radio terminals 204, 205, 209, 210 with integral cipher capabilities. While one embodiment includes both Ethernet switching capabilities and link rate adaptation capabilities, all of the encryption function disclosed below can be reduced to a single input and a single bit rate radio by the simple elimination of un-needed modes.

In the system 200, terminals with integral encryption modules are illustrated. A piece 201 of user networking equipment transmits data to the radio terminal 204 via a cable 202. A cipher unit 203, located inside the radio terminal 204, encrypt the data from the cable 202 thus a link 212 over the air is encrypted. A terminal 205 at an opposite side of a point-to-point radio link with terminal 204 decrypts the data using a cipher unit 206, thus the terminal input/output cables 207 and 211 do not carry any encrypted data that is carried over the radio link 212. The data on the cable 211 enters another radio terminal 209 and if desired, this data is similarly re-encrypted (using another cipher unit in that radio terminal) for the link 213, to be decrypted by the next terminal 210. In the system, each cipher unit may perform encryption only, decryption only or encryption and decryption.

FIG. 3 shows some of the building blocks of each radio terminal 300 shown in FIG. 2. Each radio terminal may include a main Ethernet port 301 and additional Ethernet ports 302 that support Gigabit Ethernet and/or Fast Ethernet (FE). These ports are coupled to a baseband/digital block 303 which performs most or all of the digital operations of this terminal including the encryption and/or decryption. The encrypted data with the radio-link overhead is transferred via a digital bus 304 to the transmit side of an RF/Modem section 305 to be radiated as the payload of a modulated microwave frequency carrier via an antenna 306. Since the radio terminal may include an adaptive rate function as described in U.S. patent application Ser. No. 11/322,972 which is incorporated herein by reference, two separate receive bitstreams are provided. A bitstream bus 307 may carry demodulated raw bits from the receive side of the RF/Modem section 305 to the Baseband/Digital portion 303 at a GigaEthernet rate (GigE-rate) with the appropriate overhead, while another bus 308 runs at the corresponding FE rate. Only one of these busses carries valid information at a given instance based on the currently assigned link speed. The RF modem 305 will not be discussed in detail since it is fully described in U.S. patent application Ser. No. 11/322,972 which is incorporated herein by reference. Each radio terminal 300 may include a cipher unit that does not require modification to the modem portion 305.

FIG. 4 illustrates more details of the baseband/digital portion 303 with the integrated cipher unit. As shown, each terminal may include a well known serializer/deserializer (SERDES) transceiver 404 (such as the commercially available TLK2201 integrated circuit for example) that converts parallel data used by the FPGA 400 (at 1.38 Gbps) to a serial high-speed interface 405 and 408 with the intermediate frequency/radio frequency (IF/RF) sections. A processing unit (not shown) may include the entire protocol stack needed to implement the agent functions of network-element management, including Ethernet, TCP/IP, HTML server and SNMP. The processing unit may also control the other components and blocks of the baseband/digital portion 303 and may be one or more microcontrollers with memory and software to perform the functions and operations identified above as well as to initialize, configure and control the encryption-related functions and run the protocol stacks needed to execute the encryption key loading.

The terminal may also include an external interface 401 that provides the connection with external Ethernet systems via fiber optic or copper-based cables. While only one GigE interface 401 is shown, multiple interfaces may be used and those interfaces can be added with each connected to another port in a well known Ethernet switch 403. If fiber optic interfaces are used in the terminal, a transceiver 402 converts the fiber signals (optical) at either the GigE or FE speed into electrical signals wherein the converted optical signals are fed into the switch 403 and the converted electrical signals from the switch 403 and output over the fiber optic interface.

The transmit/receive data path within the exemplary circuit in FIG. 4 will now be described. First, the data path for a signal to be transmitted by the radio over a wireless link (known as the transmit data path) will be described. Then, the data path for a signal received by the radio over the wireless link and sent over the Ethernet interfaces (known as the receive data path) will be described. For the transmit data path, one or more outside Ethernet frames from the port 401 arrive as electrical signals at the switch 403 via the transceiver 402. The switch 403 performs all relevant Ethernet switching functions in a well known manner that will not be described further herein. For example, the switch 403 may be implemented using an off-the-shelf integrated circuit such as an 88E6095 made by Marvell Semiconductor, Inc. of Sunnyvale, Calif. Optionally, a router-layer can be provided above the Ethernet function, allowing for IP-level routing services, however the preferred embodiment uses Ethernet switching for cost effectiveness reasons. The switch 403 delivers each Ethernet frame to its destination port based on the frame's MAC address. The Ethernet frames destined for the radio link are passed through an active port 411 or 413. The port 411 is a Gigabit Media Independent Interface (GMII), Ethernet standard for passing the Ethernet frame MAC "payload", without the Ethernet Physical Layer code words overhead. The port 413 is a Media Independent Interface operating at the fast Ethernet speed. The choice between the ports 411 and 413 depends on the current active radio channel bit rate since the terminal provides an adaptive data rate depending on the link quality.

Returning to the transmit data path, the FPGA 400 receives the MAC packet from the active port 411 or 413 and adds proprietary overhead bits to format the packet for transmission over the air as described below. The proprietary air interface bit stream is delivered from the FPGA 400 as a parallel word to the SERDES 404 that converts the bitstream into a serial bit stream 405 that is sent to the modem portion 305 that is not described further herein.

In FIG. 4, the Digital Modem Field Programmable Gate Array (FPGA) 400 is modified to incorporate the cipher units. One modification is the increase of number of logic gates of an FPGA, a functionally equivalent custom integrated circuit to accommodate the new functions or discrete hardware circuits. Increased FPGA speed is also desired but not required. A pin-compatible FPGA exists commercially, such as Xilinx Spartan-4000. Since the data interfaces 411, 413 and the modem interfaces 405, 406 maintain the same clock rates, most of cipher functions are implemented within the FPGA 400 and its associated configuration memory/register (shown in FIG. 6).

FIG. 5 illustrates more details of the digital block 400. As shown, the logic circuits may receive the GMII and MII signals 500 from the Ethernet Switch 403 of FIG. 4 and may select a data rate using a port selector circuit 501 that may be controlled by a "TX GE/FE" signal 509 originating from a circuit configuration memory or directly from a GigE/FE_Req (TX GE/FE) signal. A clock signal 510 provides the related clock signal at the appropriate speed, either GigE or FE, to the circuits shown in FIG. 5. The rest of the circuits shown in FIG. 5 is identical regardless of the clock rate, thus "FE" mode is merely the GigE circuits running in "slow-motion". The data from the currently selected port (GMII or MII) at the Selector 501 is sent via a first in first out memory/buffer (FIFO) 502 to a Payload Mapper 503 that performs one or more of the following functions: the temporary storage of the transmitting payload data stream; the indication of when to insert /S/ or /T/ delimiters; the insertion of random bytes from a Pseudo Random Sequence Generator 504 when there is no data to transmit; and the delivery of the resulting payload data to a Reed Solomon Encoder 506. The Reed Solomon Encoder 506 running RS(204,188) with a Galois Filed GF(256) and appends 16 error-check words to the 188 payload words and delivers the payload words and error check words to a encoder 505 wherein the /S/ and /T/ words are generated as 10-bit sequences by the 8B/10B encoder 505 based on an indication from the Payload Mapper 503, which may be passed via the FEC encoder in parallel to the 8-bit payload word as indication bits. The frame with the payload words, check words and /S/ and /T/ words are then fed into a framer circuit 507 that generates the frame structure shown in FIGS. 5A and 5B using the payload words, check words and /S/ and /T/ words. While FEC check words are inserted or frame words are transmitted at the port 507, the data flow must be halted and the FIFO 502 provides the temporary storage. Preferably, a depth of approximately 24 bytes is sufficient for the FIFO. The framer 507 adds the "H" characters discussed below and delivers the results to the SERDES 404 of FIG. 4 via an output bus 508. As will be described below, the cipher functions can be added externally to this block.

FIG. 6 illustrates the digital block 400 that incorporates the integrated cipher capabilities. In FIG. 6, the Ethernet information, including inter frame gaps (IFG) if no information is available, is provided by a GigE-speed bus GMII 600, or an FE-speed bus 614, as selected by a Port Selector 601 and fed to the Payload Mapper 603 via a FIFO 602. The mapper 603 also includes the Framer function, to generate FEC frames. The bytes generated by the payload mapper and framer 603 are transferred to a Block Demultiplexer 608 by a bus 615. An extra 2-bit bus 616 (the actual bits and their values are shown in more detail in FIG. 7 below) indicates whether each corresponding byte in the bus 615 contains either data bytes, control bytes or interframe gap (IFG) bytes. The data bytes are aggregated by the block demultiplexer 608 to Plaintext-blocks of 128 bits each and are fed in a round robin fashion into one or more cipher units (with two cipher units 609 and 610 shown in FIG. 6 for example). The control bytes and IFG bytes are fed directly to a Block Multiplexer 611 via a bypass bus 617. The entire byte-stream is fed to an 8B/10B converter 605 and then to a Reed Solomon Encoder 606. In the embodiment shown in FIG. 6, a Galois Filed is 10-bit large (GF 1024), and thus the entire "10B" word is FEC-encoded and corrected. Some of the control words, as will be discussed below, indicate the block boundary of the cipher text. A loss of Ciphertext block synchronization will cause a long streak of errors in the received data. The new RS encoder 606 protects all of the control words, including the framing words. The 16 Frame Check Sequence (FCS) words of the encoder 606 are not compatible with the 8B/18B code, thus the resulting radio spectrum smoothness and the SERDES receive performance are degraded. To overcome this, since more than 90% of the transmitted words do comply with the 10B bit density rules, the 16 FCS words can be spread among the rest of the words of the FEC frame, as performed by an Interleaver 607. While the best performance is expected when the FCS words are distributed nearly evenly among the other frame's words, it was discovered empirically that the performance is acceptable by simply placing one compliant word between each two FCS words, yet the overall processing delay is reduced. The Interleaver function is further discusses below after discussing FIG. 7.

Each cipher unit can use any block-mode encryption/decryption method that may be based on a published block encryption/decryption protocol, such as the well known Digital Encryption Standard (DES) or any other block encryption/decryption protocol. For compliance with the above described and incorporated FIPS specifications and for what is accepted as a more advanced standard, an AES-compliant module is used, based on the published Rijndael Algorithm, as documented in the FIPS Publication 197 which is incorporated herein by reference. Each cipher unit may be implemented in a field programmable gate array (FPGA) or as part of an FPGA as digital circuits that perform the encryption and/or decryption functions, but each cipher unit may also be implemented as software or a combination of hardware and software and any of these implementations may be used by the digital microwave terminal and system described herein. AES Cipher Modules are commercially available in VHDL code for integration with the FPGA. For example, Algotronix Ltd. of Edinburgh, UK provides VHDL code that can process GigE speed with just two parallel modules when implemented in the Xilinx FPGA, described above.

Each cipher unit encrypts and/or decrypts 128-bit blocks using a cipher key with several size options between 128-bit to 256-bit. For example, a 256-bit key may be used. The key is stored in a register 618 available to the one or more cipher units. This register 618, is accessible by the systems software for key writing and updating. For simplicity, all of the one or more cipher units use the same key and the decipher key is identical to the cipher key. The keys are supplied by the user and are written to the register 618 via one of the system's interfaces. Since key secrecy is essential to the security of the cipher system, existing protocols are used to protect the key security, such as the Internet secured HTTP which is encrypted by SSL, a key-loading procedure approved by the FIPS specification and is widely in use for other secure Internet transactions.

Figure 7:
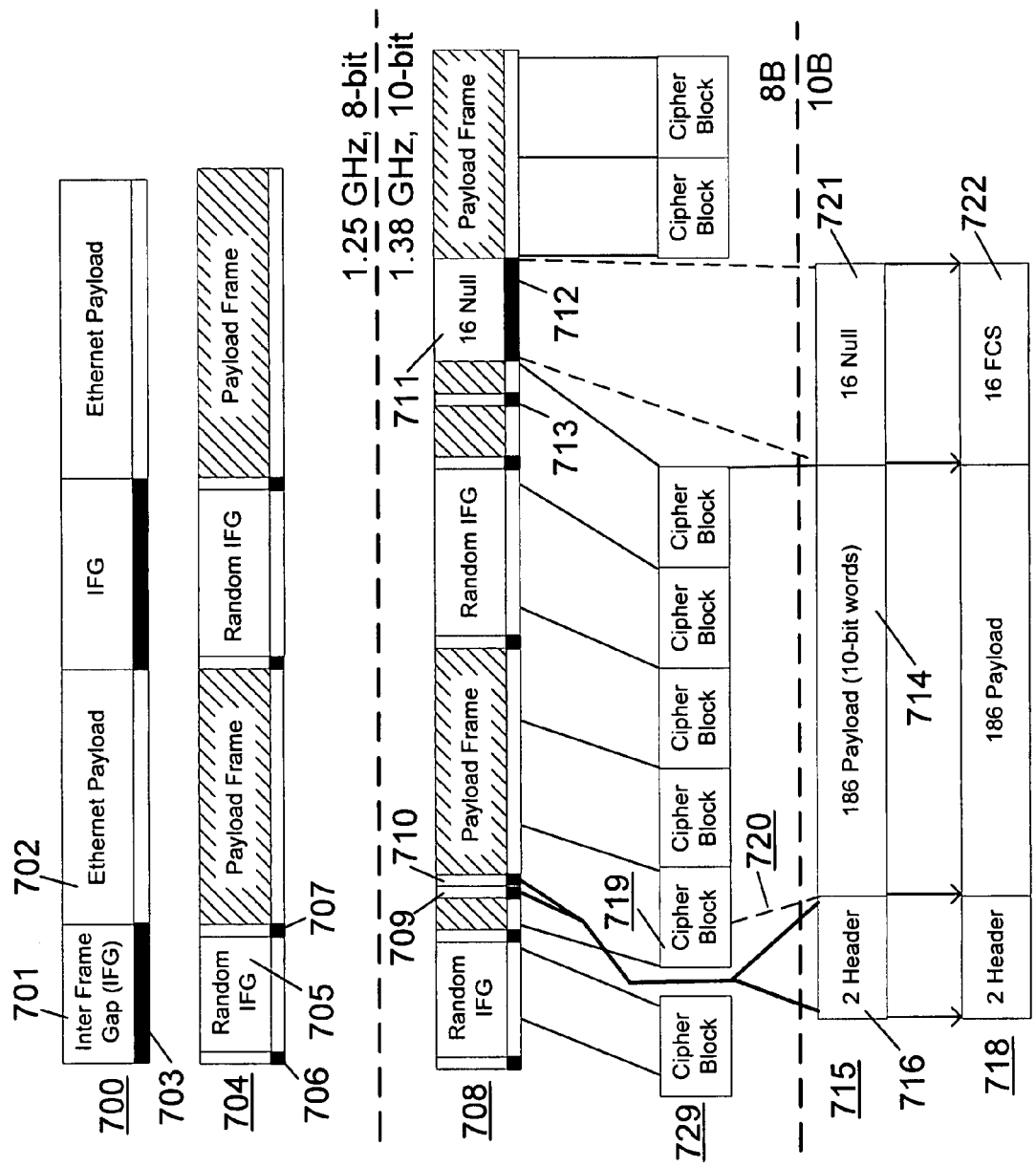
FIG. 7 illustrates the structure of the transmitted data and overhead data of the digital radio signals.

FIG. 7 depicts the data structure of the data and overhead bytes of the encrypted air transmission as performed by the circuits discussed in FIG. 6. The progress in processing steps is arranged from top to bottom, while the chronological order of information transferred is depicted from left to right. The time scale may vary arbitrarily between rows end even within the same row, mainly for the purpose of highlighting significant features.

A first row 700 depicts an arbitrary segment of the continuous information flow into the Payload Mapper 604. The flow contains either an Inter Frame Gap (IFG) 701, which by convention is all zeros, or an Ethernet Payload 702. A $9^{th}$ bit 703, from the bus 616, indicates that the associated data is either data bytes (indicated by the white color in FIG. 7 or a "1" bit) or IFG bytes (indicated by the color black in FIG. 7 or a "0" bit). As mentioned above, a $10^{th}$ bit (not shown) might be provided to indicate "Control" vs. "payload", wherein "Control" means any control word from the Ethernet vocabulary, known as "Kx.y", and "payload" means Ethernet-payload or IFG. Ethernet convention requires the IFG to have a minimum size of 12-bytes. A next row 704 depicts information in the data structure modified so that the IFG has been replaced with a block of the same size (minimum 12 bytes). The IFG content (all zeros) is replaced with pseudo random bits from a Pseudo-Random Sequence Generator 604 shown in FIG. 6, however a first IFG byte 706 is replaced with a "Frame Stop" control word, such as /T/=/K29.7/ known as "End_of_packet_delimiter", and the last byte 707 is replaced with "Frame Start", such as /S/=1K27.7/ known as "Start_of_packet_delimiter". The data structure 704 shown is generated by the framer/mapper 603.

The term "frame", in the context of Ethernet formats, corresponds to the Ethernet frame adjacent to each control word. Since these control words are used within the radio-link thus they are not delivered to an external Ethernet port and any Kx.y word can be assigned a particular indication, such as "Frame Start". It should be emphasized that the transformation from row 700 to row 704 maintains exactly the same number of bytes, thus under error-free link conditions, the Ethernet traffic delivered at the destination is identical to locally aggregated traffic, including IFG. This transparency is different from many Ethernet transmission systems, with or without encryption, that add protocol overhead and cannot provide fully transparent GigE capacity to the end-user.

The next processing step performed by the FEC encoder 606 is shown in line 708. The clock rate has changed from 1.25 GHz to 1.38 GHz, to accommodate overhead created by the FEC frame and the 8B/10B conversion. Two FEC-framing words, 709 and 710, are added at the beginning of each FEC frame. The time of occurrence of these framing words is arbitrary relative to the flow 704, since the FEC frame of 204 words is not related to the varying size of Ethernet frames and IFG. These framing 709 and 710 words are similar to the structure disclosed in U.S. patent application Ser. No. 11/322, 972 which is incorporated herein by reference. There are five control words used in the frame structured, arbitrarily named "H1, H2, H4 and H5". There are three frame-word pairs in use:

H1-H2, H1-H4 and H1-H5. The first frame-word H1 709 is a "comma" sequence, indicating both FEC-frame start and SERDES word boundaries when the receiver is not synchronized. H2 indicates that this frame is the first of a pair of two FEC frames. Both H4 and H5 indicate that this is the second FEC frame of a pair of two FEC frames. The difference between H4 and H5 is that one indicates GigE rate-request from the opposite channel and the other one indicates an FE rate request. While the pairing of FEC frames is not necessary, the implementation of a receiver with two FEC decoders is simplified this way.

In some radio applications it may be desired to exploit some of the framing words bandwidth to carry information between the opposite radio-terminals, mostly for control and maintenance purpose, termed "facility data link". For example, the word "H2" may be replaced by a byte that can assume any value, thus H2 becomes a byte of a facility data link.

Another overhead addition introduced into the word-flow 708 is a block of 16 words for frame check sequence (FCS), however since FEC encoding is performed only after encryption, at this stage of processing 708, a place-holder 711 is allocated, made of 16 Null Words. The content of these words does not matter, and the overhead bits 712 indicate "control", so as to skip encryption/decryption.

Yet a third type of overhead word 713 is added occasionally which is a control word from the Ethernet vocabulary, indicating "Stuff Word", and is arbitrarily named here "S1". The clock rate of 1.38 GHz and thus the corresponding link bit rate of 1.38 Gbps are slightly faster than the Ethernet bit rate of 1.25 Gbps with the FEC framing and FCS overheads. The remaining bandwidth is filled by the occasional addition of S1 words anywhere in a 186-word Payload field 714 of the FEC frame. The rule of inserting S1 is as follows. When the radio starts transmitting encrypted information, the first cipher block to be transmitted is preceded by S1 occupying the most recently available payload opportunity before this cipher block. Then, whenever a clock-slack indicates the need to add a stuff word, S1 will be added immediately before the beginning of the next cipher block. The symbol S1 thus also serves as an indication of the beginning of a cipher block for the purpose of synchronizing the cipher module at the transmitter with the corresponding de-cipher module at the receiver. Although not every cipher block is preceded by S1, if synchronization is lost, the next available S1 will re-synchronize the de-cipher module. More generally, S1 can be inserted at any payload transmit opportunity adjacent or having a fixed number of words in transmit-sequence relation, to the boundary of a ciphertext block for enabling block synchronization.

The next step is block encryption 729 performed by the cipher units. Only bytes originated from Ethernet payload frame, such as 702, or random IFG, such as 705, are encrypted. This excludes all control words from encryption. Since encryption is performed on a block size of 128-bit, the flow of payload for encryption is aggregated in groups of 16-bytes of Plaintext, made by fragmenting the concatenated flow of payload 702 and Random IFG 705. In a simpler ECB mode, a Plaintext block is converted by a cipher unit to a Ciphertext block, thus the applicable bytes from row 729 are encrypted to the corresponding Ciphertext bytes inserted into the payload field 714 in row 715. A Ciphertext block may be split onto two FEC frames, as happens to the block 719. The dashed line 720 indicates the split in the Ciphertext.

The next step is 8B/10B conversion (in the encoder 605), occurring between rows 729 and 715, and depicted as a dashed line. A row 718 depicts the FEC frame after a Null Sequence 721 has been replaced by 16 words of FCS 722. The FEC frame 718 now undergoes the interleaving steps performed by the block 607 in FIG. 6. The interleaving is not shown in FIG. 7. The interleaving for GigE-mode is described first. Two consecutive FEC frames are named "F1" and "F2". If the n-th word of the F1 frame is named "F1.n", where "n" is sequentially between 1 and 204, then the Interleaver output is:

F1.1, F1.53, F2.1, F2.53, F1.2, F1.54, F2.2, F2.54 . . . F1.152, F1.204, F2.152, F2.204

While the goal of the Interleaver was to insert non-FCS words between FCS words, as the last four words in the above series indicate, it was desired to maintain low processing latency and simplicity in feeding the above double-frame to a corresponding two FEC decoders in parallel. This is the main reason for not distributing the FCS overhead across the entire frame, thus the first half of the above transmission does not contain FCS words.

The interleaving for FE transmission is only a single frame thus in the above series all the words F2.n are omitted and the resulting order is: F1.1, F1.53, F1.2, F1.54, . . . F1.152, F1.204.

Figure 8:
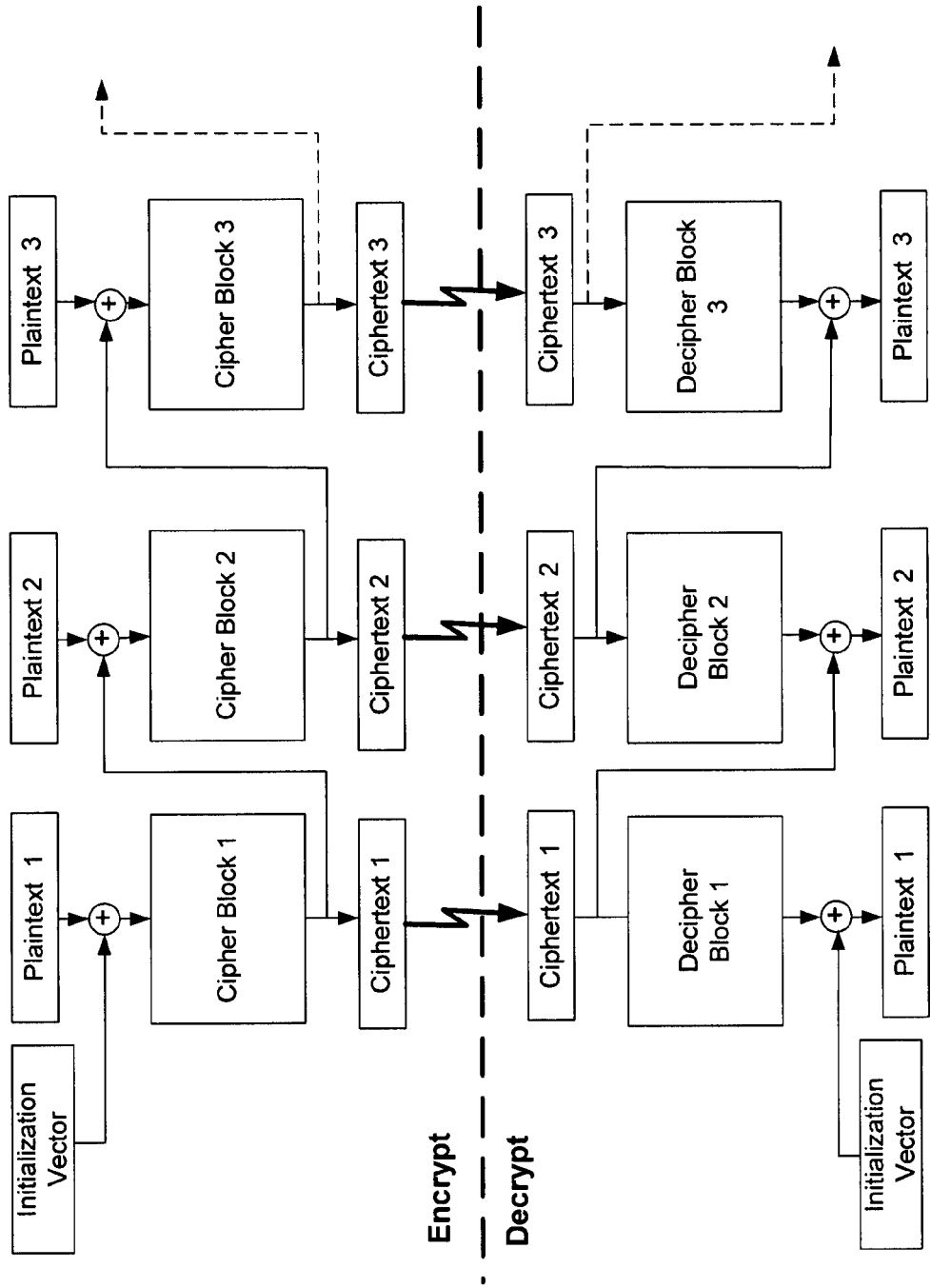
FIG. 8 illustrates a continuous Cipher Block Chaining mode as adapted for an embodiment of the digital radio terminal.

The encryption step, described above for the Electronic Code Book (ECB) mode, is modified if higher security level is desired, at the expense of some extra complexity and slightly degraded bit error performance. The processing for the more secure mode, Cipher Block Chaining (CBC), is shown in FIG. 8.

The CBC mode is described in ANSI Publication 800-38A of December 2001 which is incorporated herein by reference. FIG. 8 is a slight modification of FIG. 2 of that publication; instead of a finite chain of n-blocks, this FIG. 8 shows a transmission of a continuous flow of blocks, as preferred for a digital microwave link. In CBC, each Plaintext block is exclusive-OR-ed ("scrambled") with the previous Ciphertext block before encryption. In the receiving end, the deciphered block is exclusive-OR-ed again with the previous Ciphertext to descramble and thus regain the original Plaintext. CBC mode is effective in occasional bit-error conditions, since a single error will damage only two consecutive recovered Plaintext blocks. The first Plaintext block to be transmitted, as occurs when a radio is first turned on, does not have a previous Ciphertext, thus a random initialization vector (IV) is used instead. The IV is a sequence of 128 bits generated randomly by any approved method. In one embodiment, the IV is generated from a chain of RF amplifiers connected to a comparator, forming a random number generator. Since an IV is needed only once when the radio is turned on, the IV can be generated by the microcontroller of the terminal and be written into a register in the FPGA. The only restriction is to re-generate another IV if the radio is turned on again, thus the same value of IV is not repeated. The receiving side needs the same IV value to retrieve the original Plaintext, however coordinating the two sides of the link to use the same IV is unnecessary in one embodiment. Instead, only the transmitter generates a random IV as described above, and the receiver just ignores the first Plaintext block.

The implementation of the CBC mode is as follows. If the cipher unit 609 in FIG. 6 was performing at the ECB mode the transformation:

Ciphertext$_i$=encrypt(Plaintext$_i$), where "i" is an incrementing index of each block, then the CBC mode is:

Ciphertext$_i$=encrypt(Plaintext$_i$+Ciphertext$_{i-1}$).

If there are m cipher units operating in parallel, the CBC mode in one embodiment allows each module to use the last Ciphertext of the same module for the input scrambling, thus avoiding the need to interconnect to other cipher modules. As a result, the link CBC mode applies for each cipher unit separately, and unit module has a different IV.

Figure 9:
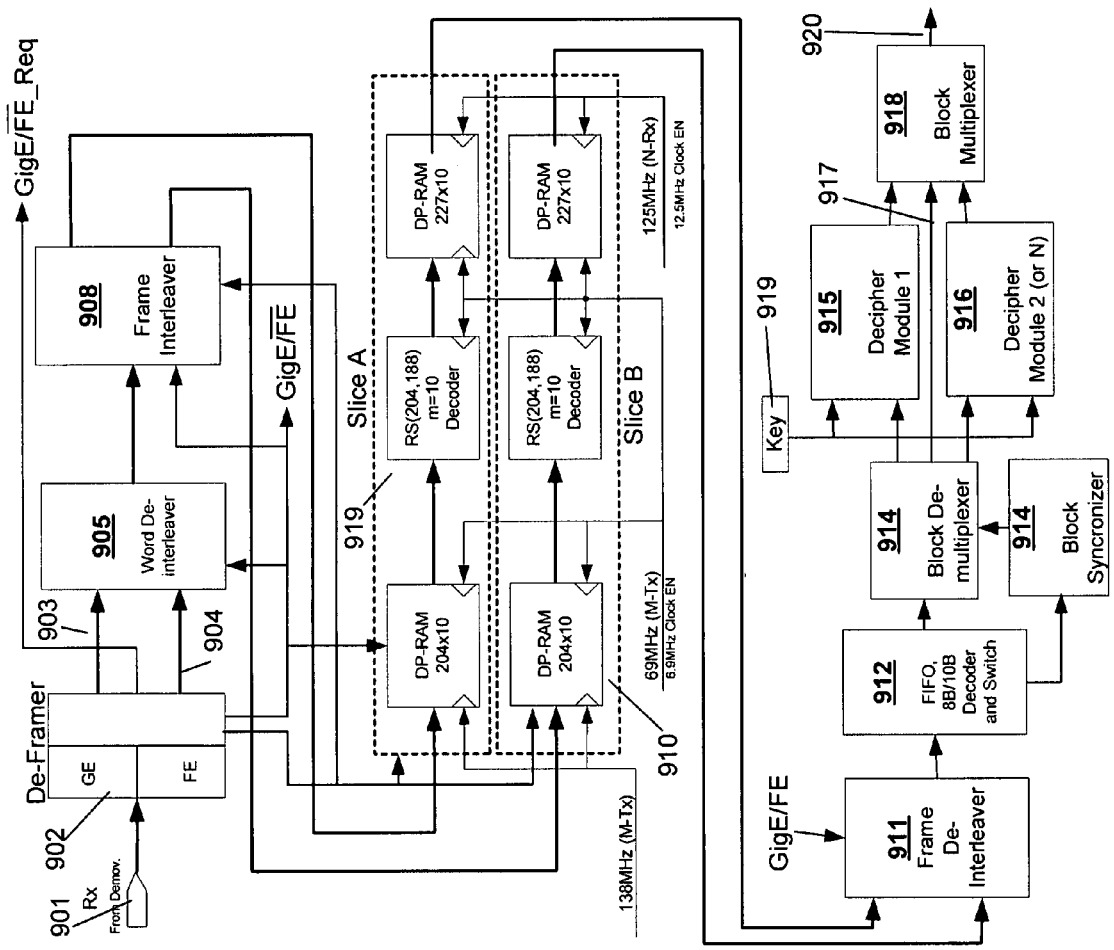
FIG. 9 illustrates some of the digital processing functions performed at the receive side of the digital radio terminal.

The receiving side of the link starts with an RF/Modem section identical to a non-encrypted radio. Recalling FIG. 3, a demodulated GigE stream at 138 Mbps 307 is delivered to the Baseband/Digital Section 303, and if the rate is FE, another bus is used 308. The receive-side processing in the FPGA is shown in FIG. 9.

A received signal 901 is synchronized by an FEC deframer 902. The word-stream 903 (GigE) or 904 (FE) is transferred to a Word-deinterleaver 905 that performs the inverse transformation discussed above in conjunction with the word-interleaver 607. The resulting word-stream is fed to an FEC Frame Interleaver 908, to allow FEC decoding with two slower decoders 919 and 910 in parallel. As with the encryption units, the decryption units (both part of the cipher unit) may be implemented using commercially available VHDL code for integration with the FPGA. For example, Algotronix Ltd. of Edinburgh, UK provides VHDL code that can process GigE speed with just two parallel modules when implemented in the Xilinx FPGA, described above.

Since the word interleaving process is tightly coupled to the FEC frame structure, as discussed above, the Word Deinterleaving function 905 and the frame interleaving 908 can be done simultaneously and these two-blocks are drawn separately for better clarity. Once the FEC is decoded, the FEC frames are de-interleaved 911, and then an 8B/10B decoder 912 recovers the data/control flow. The encryption block synchronizer 913 determines block start position by observing the arrival of a stuff control-word 713 in the decoder 912, as discussed above in conjunction with FIG. 7. This synchronization allows the Block De-multiplexer 914 to send whole blocks in sequence to the one or more cipher units (such as cipher units 915 and 916 shown in FIG. 9 that perform decryption), and then a Block Multiplexer 918 that multiplexes the blocks and delivers the original Ethernet payload at its output 920. The bit stream 920 can now be processed by an Ethernet switch or an input/output port, just like a link without encryption.

The cipher units are given a decryption key 919, which for the AES standard is identical to the encryption key. If CBC mode is in use, each module performs the operation:

Plaintext$_i$=decrypt(Ciphertext$_i$)+Ciphertext$_{i-1}$, with the same indexing conventions used for describing the CBC encryption mode above.

While the described embodiment uses an integral cipher unit(s) within each outdoor radio terminals, some users may prefer an external encryption system as depicted in FIG. 1. Despite increased cost, such system could maintain the traffic in the Cable 105 encrypted too. Given the degraded throughput of general-purpose encryption systems, the digital block 400 can be modified for use as external systems. In particular, the Baseband/Digital Unit 303 can be placed in an enclosure indoor with a power supply and a microcontroller similar to the Radio Terminal design, and the encryption techniques disclosed above can be used. The functions of FIG. 6 are part of such indoor system. The output of the word-interleaver 670 is followed by a physical Ethernet input/output port which interfaces between the word flow 612 and the external cable 105. The flow in the cable 105 is not Ethernet compatible, but most commercial Ethernet ports can transfer such signal. The Radio terminal in the outdoor converts the Cable signal to local logic signals and delivers the signal directly to an RF/modem section. The receiving side also uses a cable 108 to let the opposite external system 106 perform all of the inverse functions, such as de-interleaving, FEC decoding and decryption.

Since the cable 105 uses Ethernet electrical signals, it is possible to connect the system 102 via a cable, similar to 105, directly to the opposite system 106, thus obtain high-performance encrypted link over cable or fiber optics links.

In non-wireless applications, it is sometimes desired to maintain the original Ethernet speed over the Cable, thus the FEC and related overheads would not be acceptable in such case. Referring to FIG. 6, some functions can be eliminated in such case. The FEC frame and FCS overhead 606 and the interleaving 607 would be removed. The output of the 8B/10B converter would go straight to the Cable Ethernet Interface, and referring to FIG. 7 row 708, the eliminated items are Framing 709, 710 and Null 711. To indicate cipher block synchronization without adding even the small the overhead of stuff word 713, and yet to allow SERDES word boundary synchronization, the control words 706 and 707 are re-assigned new values. The start of the Random IFG control word 706 is assigned the value "Comma Sequence" from the Ethernet control words format, and the second word 707 is assigned one of 16 possible control word values, arbitrarily renamed here V1, V2 . . . V16, indicating respectively the location of the next first word of a new cipher block.

Figure 10:
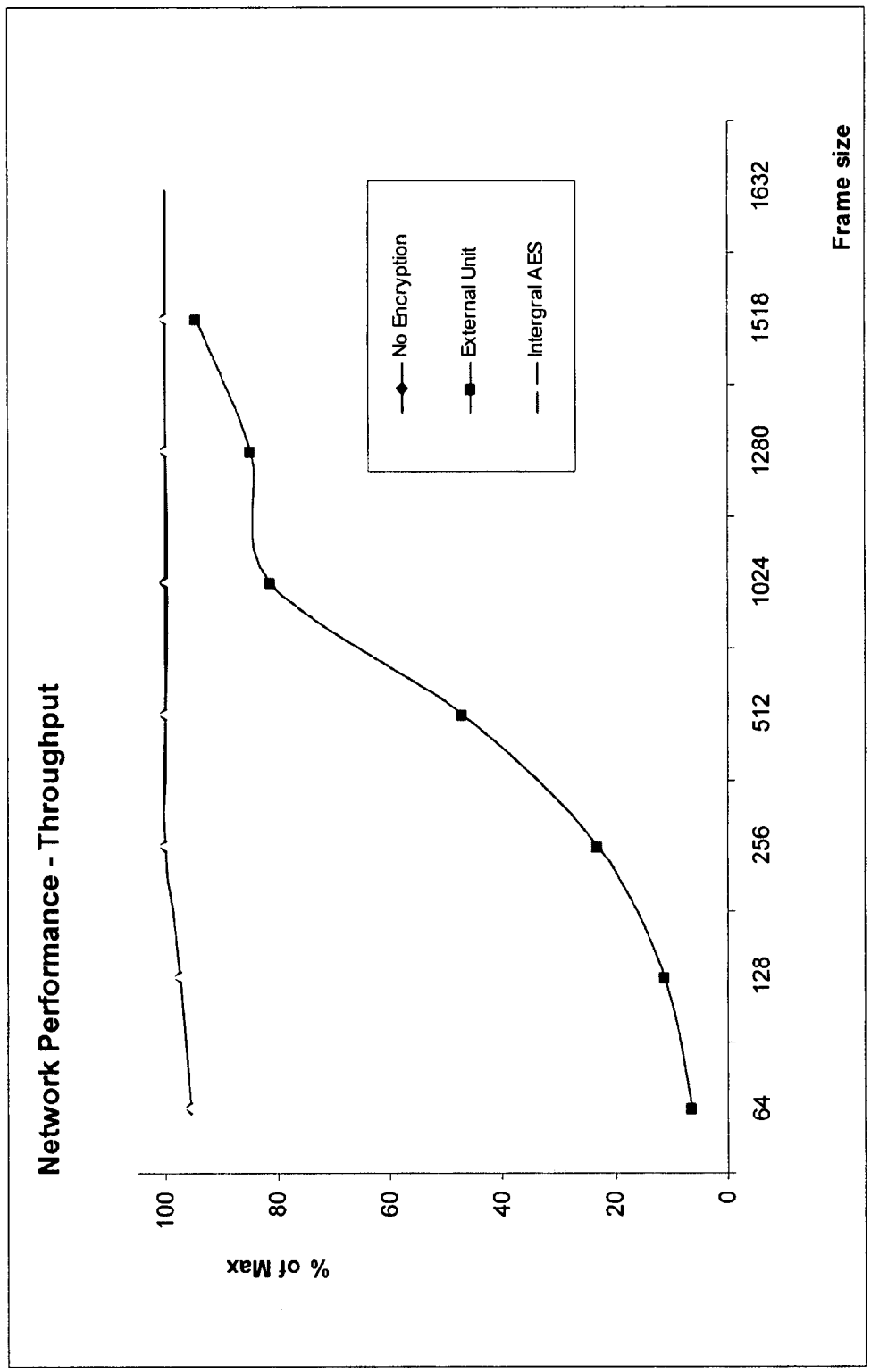
FIG. 10 is a chart comparing the network performance throughput for the digital radio with integrated encryption with the network performance throughput of a digital link with external encryption.

FIG. 10 is a chart comparing the network performance throughput for the digital radio with integrated encryption with the network performance throughput of a digital link with external encryption. As shown, the system with integrated cipher functions has substantially the same throughput (as a percentage of maximum throughput) as a digital link with no encryption showing that the system with integrated cipher functions increases the overhead by a very small amount. In contrast, the systems with the external encryption (such as shown in FIG. 1) have significantly worse throughput for most frame sizes as shown. The system with the external encryption used for comparison is a commercially available system provided by the Fortress Technologies of Oldsmar, Fla.

Figure 11:
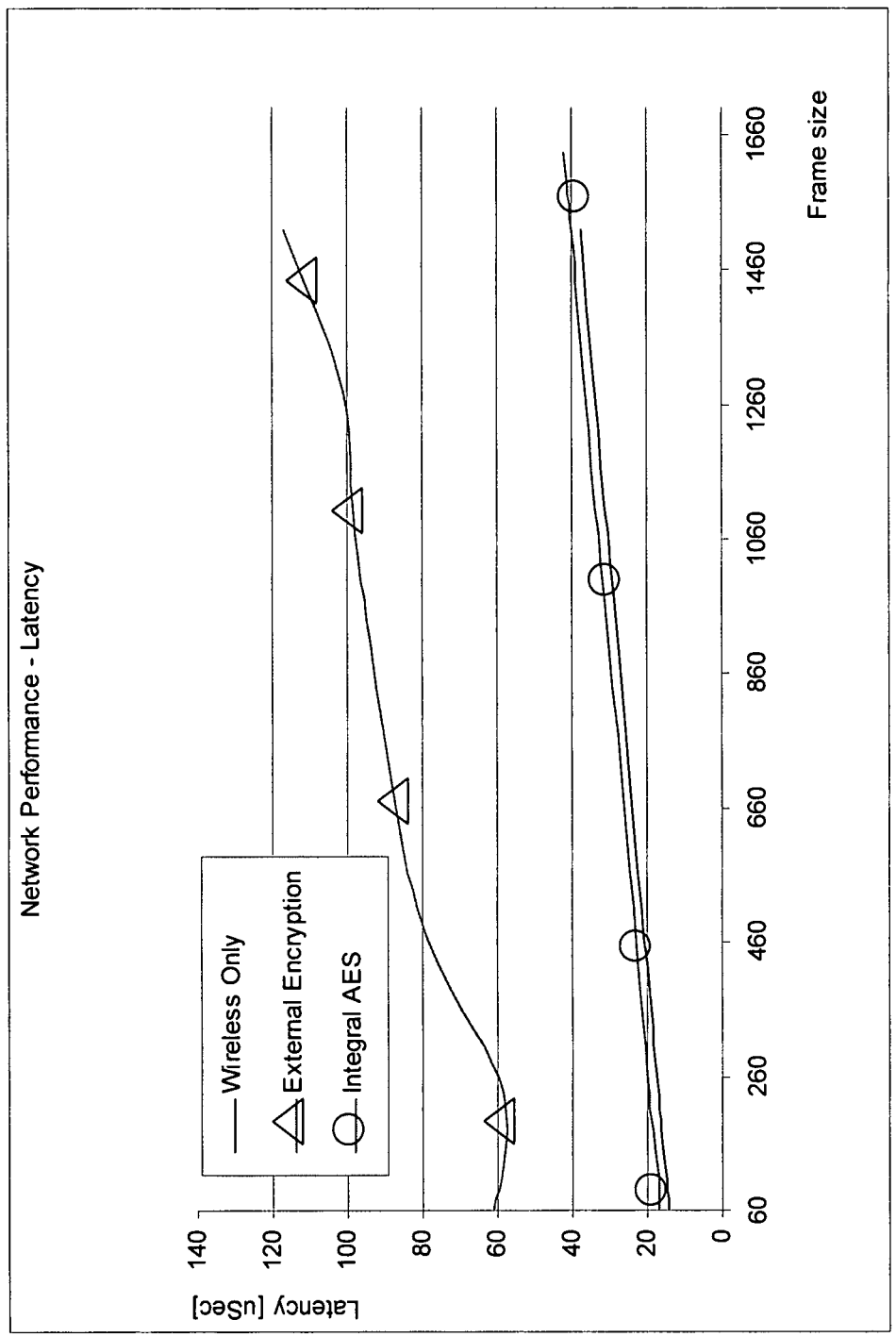
FIG. 11 is a chart comparing the network performance latency for the digital radio with integrated encryption with the network performance latency of a digital link with external encryption and a wireless link.

FIG. 11 is a chart comparing the network performance latency for the digital radio with integrated encryption with the network performance latency of a digital link with external encryption (the Fortress Technologies commercially available system as above) and a wireless link. As shown, the system with the integral cipher units has very low latency (not significantly more than the unencrypted link) whereas the system with the external encryption has significantly larger latency.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A secure digital microwave radio terminal, comprising:
   at least one Ethernet interface;
   a payload mapper that extracts one or more bytes from the data on the Ethernet interface including an inter-frame gap, having a first byte and a last byte that are Ethernet control words and at least one other byte with random bits, fragments the inter-frame gap into one or more blocks of data, and receives and inserts into the one or more blocks of data, data from a pseudo random sequence generator in response to a determination that there is no inter-frame gap to fragment into the one or more blocks of data;
   at least one cipher unit that encrypts each block of data into a ciphertext block of data; and
   at least one forward error correction encoding unit that adds error-check overhead bits to the ciphertext block of data before transmission over a microwave link.

2. The terminal of claim 1 further comprising at least two cipher units wherein the at least two cipher units operate in parallel to encrypt the one or more blocks of data.

3. The terminal of claim 1, wherein each cipher module uses an Advanced Encryption Standard (AES) encryption protocol.

4. The terminal of claim 1 further comprising an 8B/10B code converter that feeds 8B/10B-compliant data words into the forward error correction encoding unit.

5. The terminal of claim 4 further comprising an interleaver that inserts the 8B/10B-compliant data words between a portion of the error-check overhead bits.

6. The terminal of claim 4, wherein said 8B/10B compliant data words include Ethernet Control Words inserted for indicating a forward error correction frame boundary.

7. The terminal of claim 6, wherein one of the Ethernet Control Words is used to insert stuff-word-indicator words for the purpose of clock rate adaptation between said wireless link and said Ethernet Interface.

8. The terminal of claim 7, wherein said stuff-word-indicators are inserted at the payload transmit opportunity adjacent to a boundary of a Ciphertext block of data for synchronization.

9. The terminal of claim 1 further comprising at least two forward error correction decoding units operating in parallel.

10. The terminal of claim 1, wherein the cipher unit operates in a cipher block chaining mode.

11. The terminal of claim 1, wherein the cipher unit operates in an electronic code book mode.

12. The terminal of claim 10 further comprising a receive side that receives and decrypts the ciphertext block of data wherein the cipher unit has a decryption unit that uses an arbitrary initialization vector to descramble a first plaintext block of data from a descrambler.

13. The terminal of claim 1 further comprising an enclosure that houses the at least one Ethernet interface, the payload mapper, the at least one cipher unit and the at least one forward error correction encoding unit and a radio frequency unit.

14. The terminal of claim 1 further comprising an enclosure that houses the at least one Ethernet interface, the payload mapper, the at least one cipher unit and the at least one forward error correction encoding unit, and further comprising a radio frequency unit separate from the enclosure.

15. A process for securing a microwave link, comprising:
   extracting an inter-frame gap, having a first byte and a last byte that are Ethernet control words and at least one other byte with random bits, from an interface carrying Ethernet traffic;
   fragmenting the inter-frame gap into one or more blocks of data;
   receiving and inserting into the one or more blocks of data, data from a pseudo random sequence generator in response to a determination that there is no inter-frame gap to fragment into the one or more blocks of data;
   encrypting each block of data into a ciphertext block;
   adding forward error corrected overhead words to generate an encrypted forward error corrected bitstream; and
   transmitting the encrypted forward error corrected bitstream over a microwave link.

16. The process of claim 15, wherein the encrypting further comprises using an Advanced Encryption Standard (AES).

17. The Process of claim 16, wherein the encryption step further comprises using cipher block chaining mode.

18. The Process of claim 15, wherein the encryption step further comprises using electronic code book mode.

19. The Process of claim 15 further comprising converting the ciphertext block into 8B/10B code to generate 8B/10B-compliant words prior to the addition of the forward error corrected overhead words.

20. The Process of claim 19 further comprising interleaving at least some of the forward error corrected overhead words with the 8B/10B-compliant words to generate interleaved data prior to transmitting the interleaved data over the microwave link.

21. The Process of claim 20, wherein said 8B/10B compliant words include an Ethernet control word inserted for indicating forward error corrected overhead word frame boundaries.

22. The Process of claim 21, wherein one of said Ethernet Control Words is used for inserting stuff-word-indicator words for the purpose of clock rate adaptation between said microwave link and said Ethernet Interface.

23. The process of claim 22, wherein at least some of said stuff-word-indicators are inserted at the payload transmit opportunity adjacent to the boundary of a ciphertext block for synchronization.

24. The process of claim 15 further comprising receiving and decrypting a ciphertext block of data wherein the decryption uses an arbitrary initialization vector to recover a first plaintext block of data from the ciphertext block of data.

* * * * *